United States Patent Office 3,442,311
Patented May 6, 1969

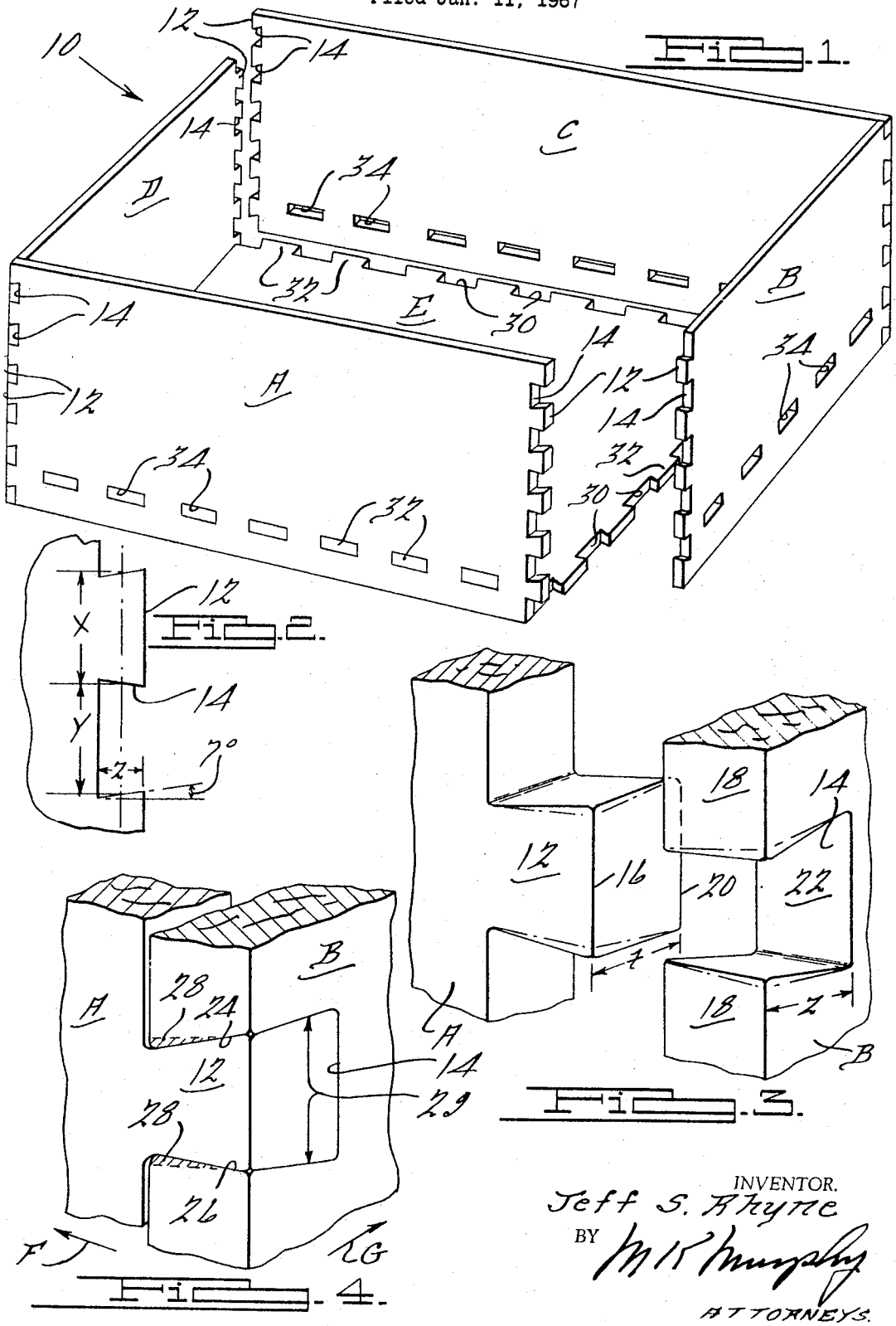

3,442,311
DOVETAIL JOINT
Jeff S. Rhyne, 537 E. Lafayette St.,
Marianna, Fla. 32308
Filed Jan. 11, 1967, Ser. No. 608,545
Int. Cl. B27f *1/08;* F16b *5/07;* E04b *1/54*
U.S. Cl. 144—319                                    9 Claims

ABSTRACT OF THE DISCLOSURE

A method of forming a right angle joint between two panel members wherein an edge of each member is stamped to form alternate dovetail tenons and mortises along that edge, whereafter the panel members are pressed together at right angles to force the tenons on the one member into the mortises on the other member. As the tenons enter the mortises, the material of each deforms to allow the small edge dimension of the mortises to pass the large leading portion of the tenons and allow the tenons to seat fully within the mortises, whereupon the deformed material of the mortises expands to grasp the root of the tenons and form a joint interlocking in both directions of relative movement.

Background of the invention

This invention relates to containers and the like. More particularly, it relates to a method of joining together a plurality of rectangular panel members to form a closed, box-like structure suitable for use, for example, as a drawer for an article of furniture.

Many methods have been proposed for joining panel members together. Perhaps one of the most popular methods involves the use of a so-called dovetail joint. Dovetail joints, while generally satisfactory, offer resistance to separating movement of the panel members only in one relative direction. If resistance to separating movement in both directions of relative movement is required, some other means, such as glue, must be employed. Many attempts have been made to modify the standard dovetail joint to enable it to offer resistance to separating movement in both relative directions. In each case however, the proposed modification, while perhaps accomplishing the desired double interlock, has been so complicated and expense as to render the resulting joint commercially impractical.

Summary of the invention

A primary object of the present invention is to provide an improved method of joining together panel members.

Another object is to provide an improved joint of the dovetail type.

Another object is to provide a method of achieving a double interlock in a joint of the dovetail type.

According to the method of the invention, a plurality of tenons are formed along one edge of one of the panel members to be joined, and a plurality of mortises are formed along one edge of the other panel member. The mortises formed in the one member have the same size and shape as the tenons formed in the other member and the mortises and tenons each present a dovetail configuration when viewed in the plane of the member in which they are formed. Following formation of the mortises and tenons, the panel members are pressed together at right angles one to the other to force the tenons on the one member into the mortises on the other member. Since the leading portion of each tenon has a width greater than the width of the corresponding mortise measured at the outer edge of the panel member, the material of the tenon and mortise must mutually deform to pass the tenon and allow it to seat fully within the mortise. After the leading edge of the tenon has passed, the deformed material of the mortise expands to grasp the tenon adjacent its root. The interengaged and mutually deformed tenons and mortises thus form a double interlock precluding separating movement of the panel members in either direction of relative movement.

Brief description of drawings

A preferred embodiment of the invention is illustrated in the accompanying drawing. In the drawing:

FIG. 1 is a perspective, partially exploded view of a container embodying features of the present invention;

FIG. 2 is a fragmentary view on an enlarged scale showing a portion of one edge of one of the panel members forming the container of FIG. 1;

FIG. 3 is a detail view on an enlarged scale showing a single tenon prior to its forced insertion into the corresponding mortise; and FIG. 4 is a view similar to FIG. 3 but showing the mortise and tenon in their interlocked positions.

Detailed description of the preferred embodiment

The method of the invention is demonstrated in the disclosed embodiment in the assembly of a rectangular container 10 seen in partially exploded form in FIG. 1. Container 10 includes four rectangular side panels A, B, C, and D, and a rectangular bottom panel E. Each of the panel members may be formed, for example, from one-quarter inch particle board or other natural or composition material capable of undergoing deformation and having some resiliency.

A plurality of alternate tenons 12 and mortises 14 are formed along two opposite side edges of each side panel. The tenons and mortises on each panel have a dovetail configuration when viewed in the plane of that panel and have walls extending generally normal to that plane. The tenons on any given side panel are preferably of exactly the same size and shape as the tenons on any other panel and the mortises preferably have the same size and shape as the tenons.

For example, and as best seen in FIG. 2, the walls of each of the tenons and mortises may be inclined at an angle of approximately seven degrees to the horizontal and the mean diameter X of each tenon and the mean diameter Y of each mortise may equal one-half inch. Further, the height Z of each tenon (and the depth of each mortise) is equal to or slightly less than the thickness of the panels. Thus, if the panels are formed of one-quarter inch particle board, the dimension Z will also be one-quarter inch or slightly less. The mortises and tenons are formed in a stamping operation performed on an automatic feed punch press.

Following the stamping operation, panels A and B, for example, are pressed together at right angles one to the other to force the tenons on panel A into the mortises on panel B and the tenons on panel B into the mortises on panel A. This step may be performed, for example, by the use of a hydraulic clamp or similar force applying apparatus.

Since the width of the mortises measured at the very side edge of the panel is less than the width of the leading edge of the tenons, a certain amount of deformation must take place to permit the tenons to seat fully within the mortises. The nature and extent of this deformation is best seen in FIGS. 3 and 4 wherein it is assumed that the panel B is held stationary while panel A is moved toward it at a right angle.

As the tenon 12 enters the mortise 14, the material at the top and bottom of the outer leading edge 16 interferes with the material at the edge face 18 of the panel B so that a mutual deformation takes place to allow the tenon to pass. The extent of deformation of the tenon is greatest at the outer leading edge 16 and progressively less proceeding across the thickness $t$ of the tenon with the inner leading edge 20 theoretically suffering no deformation; the extent of deformation or spreading of the mortise is greatest at edge face 18 and progressively less proceeding along the depth Z of the mortise with the mortise theoretically suffering no deformation or spreading adjacent the root face 22.

The approximate final configuration of tenon 12 and mortise 14 following seating of the tenon fully within the mortise is shown by the dash lines of FIG. 3. The interlocking relationship of the deformed mortise and tenon is shown in FIG. 4. Note that some of the material along the mouth edges 24 and 26 of the mortise that was deformed by the passage of the large leading edge of the tenons has expanded following passage of this leading edge to grasp the root or small dimension of the tenon. This deformed and then expanded material is shown by the shaded areas 28 in FIG. 4.

The joint formed thus precludes separation of the panels A and B in either direction of relative movement. Specifically, any tendency of panel A to separate from panel B by movement in the direction of the arrow F in FIG. 3 is resisted by the interference between expanded material 28 and the leading edge of tenon 12. Any tendency of panel B to separate from panel A by movement in the direction of arrow G is resisted by interference between the material at the mouth of the mortise and the large undeformed dimension of the portion 29 of the tenon positioned adjacent the root of the mortise.

Pane B may be joined to panel C in a similar manner, as may be panel C to panel D and panel D to panel A.

Referring again to FIG. 1, bottom panel E has alternate mortises 30 and tenons 32 formed along each of its edges. The mortises and tenons have a dovetail configuration when viewed in the plane of panel E and are adapted to coact with a plurality of rectangular apertures 34 formed along the bottom edge of each panel member A, B, C, and D. Mortises and tenons 30, 32 are preferably of the same size and shape as mortises and tenons 12, 14, and, like mortises 12, 14, may be formed in a stamping operation performed on an automatic feed punch press. Apertures 34 may be formed in a punching operation using a simple, straight sided punch.

Apertures 34 have a width approximating the width of tenons 32 measured at the root; thus, when tenons 32 are forced into apertures 34, a mutual deformation of the material of the tenon and the material around the aperture occurs to allow the aperture to accept the oversize dimension of the leading edge of the tenon. Tenons 32 and apertures 34 thus coact to hold bottom E securely in place.

The invention will be seen to provide a simple and inexpensive method of forming a double interlock joint between panel members. The method offers cost savings not only because of its basic simplicity as measured in terms of a minimum number of production steps, but also because it is peculiarly adapted to the use of low cost composition board materials. The method of the invention effects further cost savings by allowing the application of mass production stamping techniques to the formation of the various panel members.

Although a preferred embodiment of the invention has been illustrated and described in detail it will be apparent that various changes and modifications may be made in the disclosed embodiment without departing from the scope or spirit of the invention as defined in the appended claims.

It should be noted that the conventional dovetail tenon and mortise cannot be formed by stamping or punching but must be cut by use of a dovetail router bit, and the conventional joint provides locking action in one direction only. Such a joint is unsatisfactory for use in drawer construction, for example, because force is exerted in opposite directions during normal opening and closing of the drawer. The method disclosed and claimed herein not only reduces the cost of production by facilitating use of stamping or punching technique, but actually provides a stronger joint.

I claim:
1. A method of forming an interlocking right angle joint between two panel members formed of a deformable, resilient material comprising the steps of:
   (A) forming a plurality of tenons along an edge of one of said panel members having a dovetail configuration when viewed in the plane of said one member;
   (B) forming a plurality of mortises along an edge of the other of said members having a dovetail configuration when viewed in the plane of said other member and having a size and shape generally matching those of the tenons formed on said one member; and
   (C) pressing said panel members together at right angles one to the other to force the tenons on said one member into the mortises on said other member.
2. A method of forming an interlocking angle joint between two panel members formed of a deformable, resilient material comprising the steps of:
   (A) forming a plurality of tenons along an edge of one of said members having a dovetail configuration when viewed in the plane of said one member and having walls extending generally normal to said plane;
   (B) forming a plurality of mortises, having a size and shape generally corresponding to those of said tenons, along an edge of the other of said members having a dovetail configuration when viewed in the plane of said other member and having walls extending generally normal to that plane; and
   (C) pressing said panel members together at an angle one to the other to mutually deform the coacting tenons and mortises and allow the small dimensions of the mortise to pass the large dimensions of the tenons and seat the tenons within the mortises, whereupon the deformed material of the mortises may expand to grasp the root of the tenons and form a joint interlocking in both directions of relative movement.
3. The method of claim 2 wherein:
   (D) said panel members are brought together during said pressing operation at right angles, one to the other, whereby to form a right angle joint.
4. The method of claim 2 wherein:
   (D) said forming operations are performed as stamping operations.
5. The method of claim 2 wherein:
   (D) said one panel member has a thickness approximately equal to the depth of the mortises on said other panel member and
   (E) said other panel member has a thickness approximately equal to the height of the tenons on said one panel member.
6. A method of forming a closed polygonal structure from a plurality of rectangular panel members comprising the steps of:
   (A) forming along two opposite side edges of each of said panel members a plurality of alternate mortises and tenons having a dovetail configuration when viewed in the plane of that member and having walls extending generally normal to said plane; and
   (B) orienting each of said panel members at an angle to another panel member while pressing the tenons on one edge of that member into the mortises in one edge of the other member, whereby to join said panel members together in edge to edge relation to form a closed structure.
7. The method of claim 6 wherein:
   (C) said panel members are four in number so that in the resulting closed structure they form the four sides of a parallelogram.

8. The method of claim 7, and including the further steps of:

(E) providing an additional panel member of generally parallelogram form;

(F) forming a plurality of alternate mortises and tenons of dovetail configuration along all four edges of said additional panel member;

(G) forming a plurality of apertures in each of said side panel members along the bottom edge thereof: and (H) pressing the tenons on the four edges of said additional panel into the apertures in the bottom edges of said side panels, whereby said additional panel constitutes a bottom panel for said structure.

9. The method of claim 8 wherein:

(I) all of the aforesaid forming operations are performed as stamping operations.

References Cited
UNITED STATES PATENTS 2,123,081   7/1938   Sadenwater _____ 144—309

GERALD A. DOST, *Primary Examiner.*

U.S. Cl. X.R.

287—20.92; 52—284